Oct. 28, 1958 A. J. LUTZ 2,858,420
SIMPLEX RADIO TELEPHONE SYSTEM
Filed Aug. 14, 1953 2 Sheets-Sheet 1
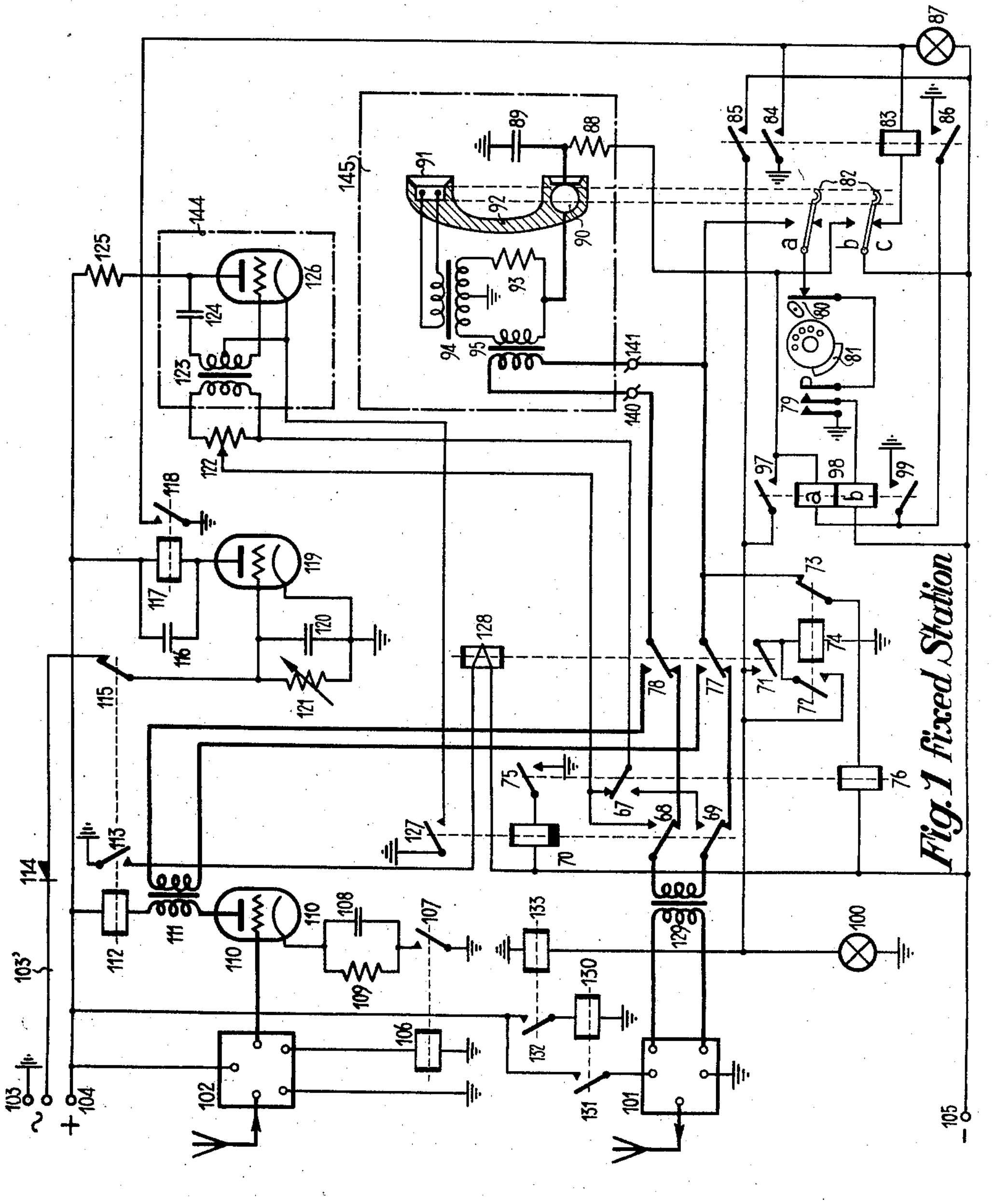
Fig. 1 fixed Station
INVENTOR.
Antonius Johannes Lutz
BY
Michael S. Striker
Attorney Oct. 28, 1958 A. J. LUTZ 2,858,420
SIMPLEX RADIO TELEPHONE SYSTEM
Filed Aug. 14, 1953 2 Sheets-Sheet 2
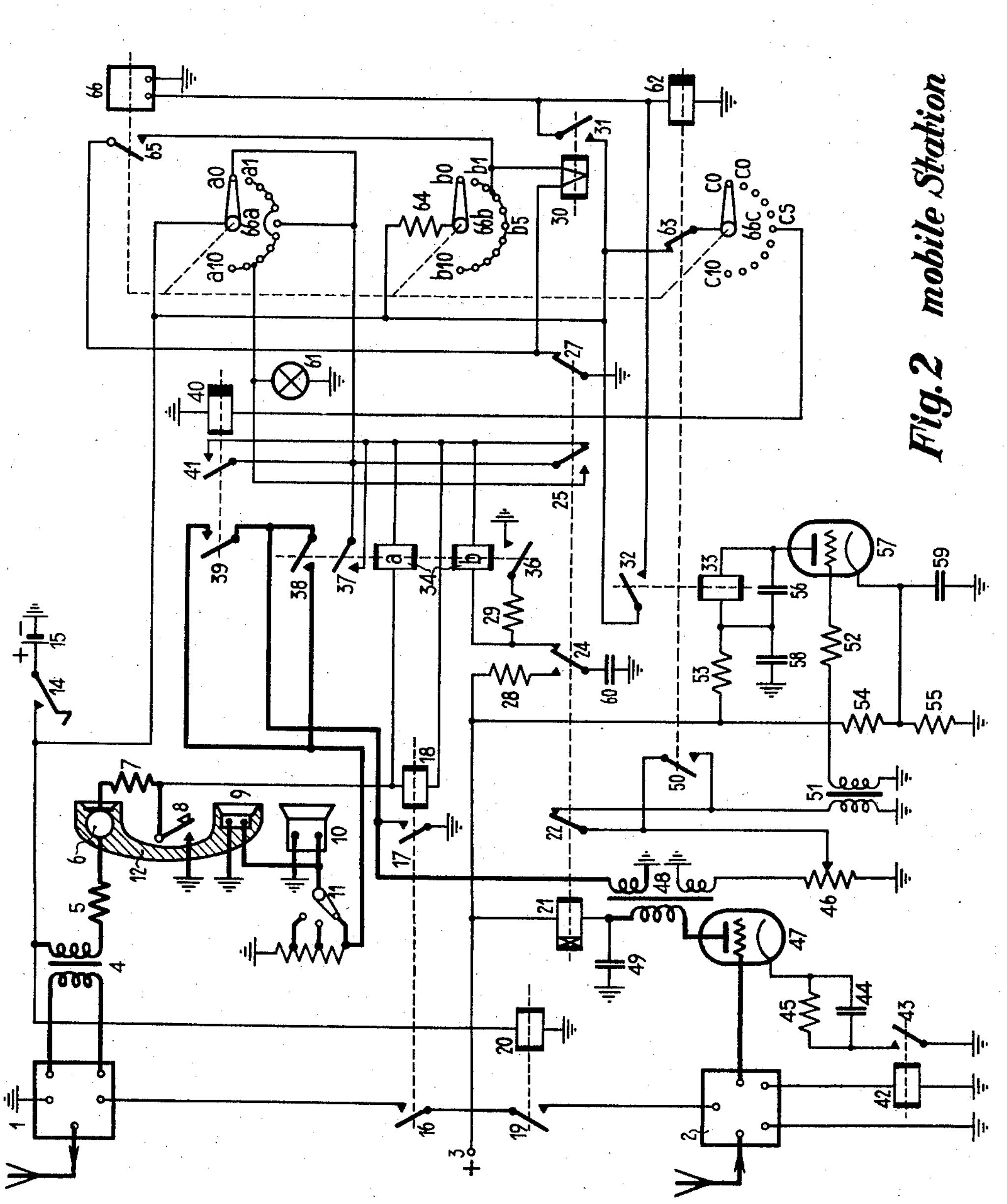
Fig. 2 mobile Station
INVENTOR.
Antonius Johannes Lutz
BY
Michael S. Striker
Attorney

United States Patent Office 2,858,420

Patented Oct. 28, 1958

2,858,420

SIMPLEX RADIO TELEPHONE SYSTEM

Antonius Johannes Lutz, Badhoevedorp, Netherlands, assignor to Staatsbedrijf der Posterijen Telegrafie en Telefonie, The Hague, Netherlands Application August 14, 1953, Serial No. 374,389

Claims priority, application Netherlands January 14, 1950

1 Claim. (Cl. 250—6)

The present invention relates to a telephone system and more particularly to a simplex radio telephone system.

This application is a continuation-in-part of my U. S. application, Serial No. 205,060, filed on January 9, 1951, now abandoned, and entitled "Telephone System With Mobile Stations Connected to a Switchboard."

It is an object of this invention to provide a telephone system which will enable a main station to call one of a plurality of secondary stations while simultaneously disabling the operation of all non-selected secondary stations.

It is another object of this invention to automatically operate the transmitter of a main station when the main station receives a carrier frequency from a calling station, the transmission of the main station being received only by the calling station.

It is yet another object of this invention to prevent any but the selected secondary station from forming a connection with the main station during an active connection between the main station and the selected secondary station.

One of the arrangements in accordance with the invention comprises a radio telephone system comprising, in combination, a main station including a transmitter tuned to a first carrier frequency, a receiver tuned to a second carrier frequency, means for modulating said transmitter by selector pulses, means responsive to the reception of said second carrier frequency for actuating the transmitter, and microphone and telephone circuits, and a plurality of secondary stations each including a receiver tuned to the first carrier frequency, a transmitter tuned to the second carrier frequency, microphone and telephone circuits, selector switch means having an operative position differing from the operative position of the selector switch means in all other secondary stations, first switch means in all other secondary stations, first switch means for rendering inactive all the microphone circuits, telephone circuits and selector switch means in the secondary stations when a secondary station is making a call, second switch means for rendering the first switching means in the respective secondary stations inoperative with respect to the selector switch means in the respective stations and positioning the selector switch means as long as the first carrier frequency received in the secondary station is modulated by selector pulses, and third switching means arranged for closing the telephone circuit in the respective secondary station and being electrically connected to the selector switch means and operated by the same when the selector switch means is in its operative position.

The novel features which are considered as characteristic for the invention are set forth in particular in the appended claim. The invention itself, however, both as to its construction and its method of operation, together with additional objects and advantage thereof, will be best understood from the following description of specific embodiments when read in connection with the accompanying drawings, in which:

Fig. 1 is a wiring diagram of the fixed station in an arrangement according to the invention; and Fig. 2 is a wiring diagram of a mobile station in an arrangement according to the invention.

Referring now to the drawings and first to Fig. 1 a transmitter 101 tuned to a first carrier frequency and a receiver 102 tuned to a second carrier frequency are shown as a block diagram. Both may be of conventional type, provided that a squelch relay 106 is incorporated in the receiver. However, for the sake of clarity the squelch relay 106 is shown separately with its contact 107, as is the output tube 110 with its output transformer 111, cathode resistor 109 and by-pass capacitor 108. Said contact 107 establishes the plate current circuit of the tube which is responsive to the reception of the second carrier frequency transmitted by the mobile stations. This frequency is assumed to differ from the first carrier frequency transmitted by the fixed station. In series with the transformer 111, is connected a relay 112 which with its contact 113 controls a relay 128 controlling contacts 77 and 78 which alternately switch over the speech conductors connected to terminals 140 and 141, respectively, from the receiver output transformer 111 to the transmitter modulating transformer 129, whereas contact 71 of relay 128 controls a relay 74 having contacts 72 and 73. Contact 73 controls a relay 76, having contacts 67 and 75, whereas the contact 72 shunts the energizing contact 71. Contact 75 energizes a slow releasing relay 70 which by means of contacts 68 and 69 switches over the input of transformer 129 as noted herewith to the output potentiometer 122 of an oscillator 144 in order to modulate the transmitter 101 with a selecting frequency. The oscillator 144 comprises a tube 126 fed via a resistor 125 by the supply terminal 104, to which any conventional plate supply voltage source (not shown), is connected. A transformer 123 and a capacitor 124 complete the oscillator 144 which is operated by a contact 127 controlled by the relay 70, whereas the output of the oscillator 144 is normally short-circuited by contact 67 of relay 76.

Neither in Fig. 1 nor in Fig. 2 a current source for heating the cathodes of the tubes is shown, because it is not important for a good understanding of the invention, though it is to be understood that all the tubes are heated in a conventional manner.

Furthermore in Figs. 1 and 2 the conductors along which a communication takes place are shown in heavy lines. In Fig. 1 a relay 117 having a contact 118 is shown, which relay, shunted by a capacitor 116, is connected in the anode circuit of a tube 119, the control grid of which is normally negative owing to its connection to the capacitor-resistor combination 120, 121, which is negatively biased by an A. C. voltage, applied between terminals 103, 103' (and derived e. g. from an A. C. heater supply) and rectified by a rectifier 114, so that tube 119 is prevented from conducting. Upon operation of contact 115 the biasing current is interrupted and the capacitor 120 is discharged over the resistor 121 for a time interval, which depends upon the RC constant of said RC combination, so that tube 119 starts conducting and operates the relay 117. A relay 133 with its contact 132 energizes a relay 130, the contact 131 of which thereupon switches on the plate supply for the transmitter 101. Supervisory lamp signals 87 and 100 operate, respectively, when the second carrier frequency emitted by the mobile stations is received and when the first carrier frequency emitted by the fixed stations is transmitted. Furthermore a relay 98 is provided having two windings *a* and *b* energized in different circuits, and contacts 97 and 99; also the operator's dial 81 is shown having a dial contact 79, which is operated when the dial is brought out of its normal position, and a pulsing contact 80 which is opened as many times as the figure dialled. A switchhook 82 having hook contacts 82*a*, *b*, and *c* normally remains in the illustrated position e. g. by the weight of a handset 92 which rests upon it. When the operator picks up the hand set 92 the hook contacts 82 take the positions opposite to those shown in the drawing, thereby breaking at *c* the energization circuit of relay 83 having contacts 84, 85 and 86. Also in Fig. 1 the operator's equipment 145, which is of a conventional type, is shown, comprising the handset 92 with a microphone 90 and a telephone receiver 91, a telephone transformer 94, a line transformer 95, which is connected to the terminals 140 and 141 of the speech conductor, resistors 88 and 93 and a capacitor 89. To the equipment 145 also belong the dial 81, and the supervisory lamp signals 87 and 100, though they are shown apart for the sake of clearness. It will be apparent from the figure, that instead of the operator's equipment 145 any subscriber's equipment, after the operator has established a connection with a mobile station, can be connected to the speech conductors simply by switching the terminals 140 and 141 through to the equipment of the wanted subscriber, for instance over an exchange in which the fixed station may be located. Terminal 105 is connected to a battery (not shown) which is negative with respect to ground (e. g. the central exchange battery).

As shown in Fig. 2 the mobile station comprises a transmitter 1 tuned to the second carrier frequency, a receiver 2 tuned to the first carrier frequency and including a squelch relay 42 with contact 43, an output tube 47 with cathode resistor 45 and by-pass capacitor 44, and an output transformer 48 in a conventional connection. These receiver parts are shown separately for the sake of clearness. As the receiver and the transmitter used are of a conventional kind the remainder thereof is shown as a block diagram. The lower high-resistance secondary of transformer 48 is connected, via a potentiometer 46, and a make contact 50 of a slow releasing relay 62, shunted by a break contact 22 of a delayed relay 21, to the primary of a transformer 51, the secondary of which is connected via a limiting resistor 52 to the grid of a tube 57 operating as a class B amplifier by imparting to it a suitable cathode potential derived over resistors 54 and 55 from a voltage supply terminal 3, to which any suitable supply voltage source (not shown) is connected. The anode circuit of tube 57 is completed by a resistor 53 and a relay 33 shunted by a capacitor 56. Upon reception of modulated first carrier frequency by the receiver 2 the selecting frequency currents are imparted via the transformer 51 to the tube 57, operating as a class *b* amplifier, so that part of these currents are rectified, and operate the relay 33, whereas the remaining A. C. component is by-passed through capacitors 56, 58 and 59; a high signal level causes grid current to flow, which current over resistor 52 causes an increase in negative grid potential, whereby the signal level is reduced again. This limiting action of tube 57 renders the operation of relay 33 less dependent on the signal level. In the plate circuit of the output tube 47 a delayed relay 21 with contacts 22, 24, 25, and 27 is connected. This relay operates when the plate current of tube 47 is switched on by the contact 43 of the squelch relay 42 in response to the reception of the first carrier frequency transmitted by the fixed station. A microphone 6, a telephone 9 and a transmitting key 8 are located in a conventional handset 12. A loudspeaker 10 is connected in parallel with the telephone 9. This circuit, termed hereinafter the telephone circuit, is completed by a volume control 11, contact 39 of a relay 40 shunted by contact 38 of a relay 34 and the upper secondary of the output transformer 48. Shunting the telephone circuit by the operation of contact 17 of a relay 18 renders the telephone circuit inactive. A battery 15 supplies a low direct voltage upon a key 14 being closed. The resultant energization of a relay 20 switches the receiver 2 on by contact 19 of relay 20. The transmitter's plate supply is controlled by contact 16 of relay 18. Microphone feed is supplied by depression of the key 8, the circuit leading from key 8 via resistor 7, microphone 6, resistor 5, primary of microphone transformer 4 and key 14 to battery 15. A relay 34 with contacts 36, 37, 38 and 39 is provided with two windings, *a* and *b*, connected in different circuits. When operated relay 34 maintains itself energized over its winding **34*b*, resistor 29 and make contact 36. When contact 24 of relay 21 changes over from front to back, a capacitor 60 charged positively over resistor 28** will cause a positive voltage to be applied to winding *b* of relay 34, whereby the potential difference across the winding is reduced so much, that the relay is deenergized (provided that winding **34*a*** is not energized at this moment).

In each mobile station a selector is provided, having a driving magnet 66 with a pulsing contact 65, and three switching sections **66*a*, 66*b* and 66*c*, each provided with a wiper and a contact bank. In each of the contact banks one contact indicated by the subscript 0 serves as home contact at which the corresponding wiper remains normally. The remaining contacts serve for selecting purposes (selecting contacts). The selecting contacts of sections 66*a*** and *c* corresponding to the number of the mobile station in question are connected in a special selecting circuit (in Fig. 2 this number is arbitrarily chosen as 5). When the operator of the fixed station dials for instance number 5 the selectors 66, in all mobile stations wherein the keys 14 are operated, step to position 5 in a manner to be described hereinafter. Only in one mobile station, represented by Fig. 2, switching operations occur, and consequently a connection between this mobile station and the fixed station is effected. Though in Fig. 2 only ten selecting contacts are shown it will be apparent that the number thereof can be chosen at will, in accordance with the maximum number of mobile stations that is likely to occur. The selecting contacts of section **66*b* are equally connected in all mobile stations as they form part of the homing circuit which further includes a relay 30 with contact 31, the pulsing contact 65 of the driving magnet 66 and the break contact 27 of relay 21. The homing circuit serves for setting the selectors in their home position when a call is finished. The selectors are of the kind in which the driving magnet is provided with a home contact (being a contact with two positions, corresponding, respectively, to the selector remaining in the home position and to the selector in one of the selecting positions), the home contact is used in the homing circuit instead of the switching section 66*b*. In that case the selectors have to be provided with two switching sections only. Further parts of the mobile stations are a slowly releasing relay 62 with contacts 50 and 63, a relay 40 with contacts 39 and 41, and a supervisory red lamp signal 61**, which operates in response to the fixed station transmitting carrier frequency either modulated or not.

Having enumerated the elements included in the fixed and mobile stations and having described the interconnection thereof, the operation of the simplex radio system according to the invention will now be explained in detail. Two cases have to be considered for the explanation of the complete operation:

(1) The mobile station originates a call.

(2) The fixed station originates a call.

These two cases will be described in this order of sequence, reference being had in both cases to Figs. 1 and 2. It is presumed, that during the time in which calls are likely to come in, filament heating is applied in both the fixed and the mobile stations, whereas in the latter the supply key 14 should be closed in order to ensure a voltage supply for the selecting circuit, the microphone feed flowing from battery 15 via primary of transformer 4, resistor 5, microphone 6, resistor 7, and microphone key 8 as soon as the latter is operated. Furthermore receiver 2 is switched on by contact 19 of relay 20. It is presumed that no carrier frequency is transmitted beforehand, either by the fixed or by any mobile station.

1. *Mobile station is calling*

Operation of microphone key 8 switches on the microphone feed and plate supply for receiver 2 in circuits traced hereinbefore, and furthermore operates relays 18 and 34 in the following circuit: ground, key 8, parallelled relay windings 18 and 34*a*, back contact 25, home contact and wiper of selector section 66*a*, key 14, battery 15, and ground. Though the telephone circuit is completed by make contact 38 of relay 34 it is kept inactive since make contact 17 of relay 18 shunts the upper output of transformer 48. At the same time contact 16 of relay 18 switches in the transmitter 1, which starts to transmit the carrier frequency of the mobile station. Relay 34 keeps itself energized in the following circuit; ground, make contact 36, resistor 29, winding 34*b*, make contact 37 (which shunts now back contact 25), home contact and wiper of selector section 66*a*, key 14, battery 15, and ground. In the fixed station the reception of the carrier frequency of the mobile stations by receiver 102 causes squelch relay 106 to close its make contact 107 allowing the output tube 110 to conduct plate current. Therefore relay 112 operates and energizes with its make contact 113 relay 128 and interrupts its break contact 115 the circuit extending from terminal 103, at which any A. C. voltage (e. g. the filament heating supply source) is applied, via rectifier 114 and R–C combination 121, 120 to the grid of tube 119. Consequently thereof the negative charge of capacitor 120 leaks away over resistor 121, causing tube 119 to conduct and relay 117 to operate with a delay dependent upon the time constant of said R–C combination. Make contact 118 of relay 117 operates supervisory lamp signal 87 as a sign that the common carrier frequency from the mobile stations is received, and operates relay 83 via switchhook 82*c* which is supposed to remain in normal position. By means of its contact 84 relay 83 keeps itself energized as long as handset 92 is not removed from hook 82, ensuring also the continued operation of lamp 87. Make contact 85 closes an operating circuit for relay 133 which in turn energizes relay 130 by means of its contact 132, so that plate supply is applied via make contact 131 to transmitter 101. Carrier frequency is transmitted now by the fixed station, which is indicated by lamp signal 100. Via contact 85 and operating make contact 71 of relay 128 an energizing circuit is established for relay 74 which by means of its contact 72 keeps itself energized as long as relay 83 is energized. Contact 73 of relay 74 interrupts the operating circuit of relay 76, thus preventing the operation of relay 70 and contact 67, 75, 68, 69 and 127, whereby keying of the selecting frequency oscillator 144 by operation of the dial 81 is rendered impossible. As operating contact 77 and 78 connect the output transformer 111 to the terminals 140 and 141 of the speech conductors, the operator can only listen. Thus it appears that transmission of the carrier frequency of the mobile stations by operation of a key such as 8 in a mobile station automatically causes the transmission of the carrier frequency of the fixed station. In the mobile stations in which the supply keys such as 14, are operated reception of the carrier frequency of the fixed stations causes the squelch relays such as 42 to operate. When contact 43 completes the path for the plate current of tube 47, delayed relay 21 will be energized, preventing by its contact 25 the operation of relays 18 and 34, so that contact 16 cannot cause the transmitter 1 to operate whereas contact 38 interrupts the telephone circuits, except in the mobile station which originated the call, in which the contact 25 is shunted by make contact 37 of operating relay 34. Thus only this station is enabled to communicate with the fixed station. If the operator of the calling mobile station releases his microphone key 8 the transmitter 1 stops transmitting and contact 17 is opened making available his telephone circuit, which is kept prepared by contact 38 of relay 34, which maintains itself energized via its winding 34*b*. Since transmitter 1 of the calling mobile station is rendered inoperative by the release of key 8, receiver 102 of the first station does not receive any carrier frequency so that relays 112 and 128 are released. Contacts 77 and 78 return to the position shown in the drawing and apply speech conductors connected to terminals 140 and 141 to the transmitter's input transformer 129, so that speech now can be transmitted by the fixed station. Relay 83 maintains itself energized via its contact 84 and switch hook 82*c*. When the operator picks up his handset 92 relay 98 operates in a circuit: terminal 105, hook contact 82*b*, relay winding 98*a*, contact 86, ground. Relay 98 operates before contact 86 has been restored to normal, due to the interruption of the energizing circuit of relay 83 by hook contact 82*c*. Breaking contact 86 is shunted meanwhile by contact 99, whereby relay 98 keeps itself energized. Make contact 97 shunts contact 85 of releasing relay 83, so that oscillator 144 remains blocked. Communication may take place now, whilst, dependent upon the position of microphone key 8 in the mobile station concerned, relays 112, 117 and 128 in the fixed station either operate or not, causing the speech conductors to be connected to the receiver 102 or the transmitter 101. Thereby lamp signal 87, operated by contact 118 of relay 117 indicates whether the operator of the fixed station is enabled to speak or not. The operator's equipment 145 is of a conventional kind, well known to persons skilled in the art. Microphone current is supplied via terminal 105, hook contact 82*b* and resistor 88 only when the handset 92 is removed from the hook 82. After the operator of the mobile station has informed the operator of the fixed station which subscriber is wanted, the operator of the fixed station switches over the speech conductors connected to terminals 140 and 141 to the exchange or directly to the wanted subscriber line. The operator of the fixed station can finish a call only if no carrier frequency from a mobile station is received any longer by putting back his handset 92, upon the switch hook 82, since in that case only relay 83 cannot operate again. Now switch hook 82*b* interrupts the energizing circuit of relay 98, which is restored to normal, together with its contacts 97 and 99, whereby the lamp signal 100 is extinguished whereas relays 133 and 130 restore to normal. Contact 131 of relay 130 thereby puts the transmitter 101 out of action.

In all mobile stations a relay such as 21 operates during a connection being held in consequence of the carrier frequency of the fixed station being received. Thereby contact 22 prevents the tube 57 and relay 33 from being affected by modulated carrier frequency. When the carrier frequency of the fixed station ceases relay 21 releases in all mobile stations. In the mobile station which took part of the radio telephone connection up to this instant, contact 24, which is restored to normal, causes capacitor 60 charged positively over resistor 28 to be discharged over resistor 29 and contact 36 which is still closed. Thus during a short time no potential difference occurs across winding *b* of relay 34, so that relay 34 releases and the connection is interrupted.

2. *Fixed station is calling*

The fixed station originates a call by picking up the handset 92 and dialling at dial 81 the number of the wanted mobile station. Rotating of the dial causes the transmission of the first selecting pulse since pulsing contact 80 remains yet inoperative, whilst dialling contace 79 operates as long as the dial is kept out of its normal position, so that relay 98 operates in a circuit; terminal 105, winding 98*b*, dialling contact 79 ground.

Relay 98 maintains itself energized in the circuit: terminal 105, hook contact **82*b*, relay winding 98*a*, contact 99, and ground. Lamp signal 100 and relay 133 operate via terminal 105, hook contact 82*b*, and contact 97 of relay 98. By means of contact 132 relay 130 is switched on, supplying at contact 131 plate voltage to transmitter 101, which starts transmitting. At the same time relay 76 is energized in the circuit: terminal 105, relay 76, break contact 73, speech conductor connected to terminal 141, hook contact 82*a*, pulsing contact 80, dialling contact 79 and ground. The turning back of the dial 81 causes pulsing contact 80 to break the circuit recurrently, so that relay 76 operates as many times as the dialled number amounts to, thereby energizing slowly releasing relay 70, which consequently remains operated during the whole dialling period, and switching on the selecting frequency oscillator 144 by contact 127 and connects the input transformer 129 to the oscillator output by front contacts 68 and 69. Recurrent pulses are transmitted by contact 67 of relay 76 which shunts periodically the output of oscillator 144. After the dial has been restored to normal dialling contact 79 is opened again and relays 76 and 70 release, so that the contacts 68 and 69 change back to normal, thus causing the fixed station to start communication with the selected mobile station. Responsive to the reception of modulated first carrier frequency are relays 21 and 33 which operate in all the mobile stations in a manner described hereinabove. Relay 33 which is sensitive to modulated first carrier frequency (selecting frequency) operates as many times as selecting pulses are received. Contact 32 thereby closes the operating circuit of driving magnet 66 periodically, thereby positioning the selectors 66*a*—66*c* in all mobile stations. Relay 62, which slowly releases, is energized in parallel with the driving magnet 66 and its contact 50 is closed before contact 22 of slowly operating relay 21 interrupts the circuit between potentiometer 46 and transformer 51, so that the operation of relay 33 is ensured. Contact 27 of relay 21 prevents relay 30 from being operated. Front contact 25 of relay 21 prevents relays 18 and 34 from being operated by operation of microphone key 8 and operates red lamp signal 61 in all mobile stations as an indication, that the wireless transmission path is engaged. In the chosen example the selected mobile station has the number 5. After five steps slowly releasing relay 40 operates via contact and wiper of selector 66*c* and contact 63 of relay 62, which released meanwhile, preventing with its second contact 50 relay 33 from being operated by reception of modulated carrier frequency. Contact 39 of operating relay 40 completes the telephone circuit in the selected mobile station. After reception of speech produced by loudspeaker 10 the mobile operator may answer after having pressed his microphone key 8, by which relays 18 and 34 are energized, with the results described before, in the circuit: ground, key 8, windings 18 and 34*a* in parallel, contact 41 of operating relay 40, contact 5 and wiper of the selector 66*a*, supply key 14, battery 15 and ground. After communication has taken place the operator of the fixed station may interrupt the connection in the way described hereinabove, namely, by putting down his handset 92 upon the hook switch 82, unless the mobile operator keeps on transmitting, in which case relay 83 in the fixed station operates, shunting with its contact 85 the contact 97 and by contact 86 maintaining relay 98 energized, so that the connection is maintained until the mobile operator stop transmitting. Interruption of the connection thus causes the fixed station to stop transmitting in a way described hereinabove. In the previously connected mobile station the release of relay 21 causes by means of contact 24 and capacitor 60 the deenergization of relay 34 in a way described hereinabove. In all mobile stations release of contact 25 extinguishes lamp signal 61, and contact 27 of relay 21, puts relay 30 into operation via selecting contacts and wipers 66*b*. Relay 30 in turn operates driving magnet 66 via contact 31. The selectors step further to their home positions. During the shifting of the wipers the operation of relay 30 is ensured by shunting contact 65 of the driving magnet 66. After the selectors have been restored to their home positions relay 30 is deenergized, interrupting with its contact 31 the operating circuit of the driving magnet 66**. Correspondingly the selectors remain in the home positions and all mobile stations are restored to normal again. Another call may now be initiated by any mobile station or the fixed station at will, whereby the same switching operations will take place as described.

It will be understood that each of the elements described above, or two or more together, may also find a useful application in other types of simplex telephone system differing from the types described above.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

A radio telephone system comprising, in combination, a main station including a transmitter tuned to a first carrier frequency, a receiver tuned to a second carrier frequency, means for modulating said transmitter by selector pulses, means responsive to the reception of said second carrier frequency for actuating said transmitter, and microphone and telephone circuits; and a plurality of secondary stations each including a receiver tuned to said first carrier frequency, a transmitter tuned to said second carrier frequency, microphone and telephone circuits, selector switch means having an operative position differing from the operative position of the selector switch means in all other secondary stations, first switch means including a squelch relay and a time delay relay for rendering inactive all said microphone circuits, telephone circuits, and selector switch means in the other secondary stations when a secondary station is making a call, second switch means for rendering said time delay relay in the respective secondary stations ineffective with respect to the selector switch means in the respective stations and positioning said selector switch means as long as the first carrier frequency received in said secondary station is modulated by selector pulses, and third switching means arranged for closing the telephone circuit in the respective secondary station and being electrically connected to said selector switch means and operated by the same when said selector switch means is in its operative position, each secondary station being provided with relay means for operatively connecting the telephone circuit in said secondary stations, said relay means being provided with a shunt connection for maintaining said relay means energized upon cessation of transmission by the transmitting station so long as the connection with the main station is maintained, said relay means being deenergized by the opening of said shunt connection when the connection between the main station and the secondary station is broken.

References Cited in the file of this patent

UNITED STATES PATENTS

| | | |
|---|---|---|
| 1,904,567 | Taylor | Apr. 18, 1933 |
| 2,478,361 | Bartelink | Aug. 9, 1949 |
| 2,479,701 | Ress | Aug. 23, 1949 |
| 2,508,613 | Lang | May 23, 1950 |
| 2,530,815 | Dimmer | Nov. 21, 1950 |
| 2,623,164 | Herrick | Dec. 23, 1952 |